US008468097B2

(12) United States Patent
Alrabady et al.

(10) Patent No.: US 8,468,097 B2
(45) Date of Patent: Jun. 18, 2013

(54) METHOD AND APPARATUS FOR PROTECTING THE PRIVACY OF RESPONDER INFORMATION

(75) Inventors: Ansaf I. Alrabady, Livonia, MI (US); Fred W. Huntzicker, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 971 days.

(21) Appl. No.: 12/338,241

(22) Filed: Dec. 18, 2008

(65) Prior Publication Data

US 2010/0161490 A1 Jun. 24, 2010

(51) Int. Cl.
*G06F 21/00* (2006.01)
*G06F 7/00* (2006.01)
*G06F 19/00* (2011.01)
*G01M 17/00* (2006.01)
*G06Q 30/00* (2006.01)
*G06Q 30/06* (2006.01)

(52) U.S. Cl.
CPC ........ *G06Q 30/0185* (2013.01); *G06Q 30/0609* (2013.01); *G06Q 2220/10* (2013.01); *G06Q 30/016* (2013.01)
USPC ........... 705/51; 701/31.4; 701/32.3; 701/32.4

(58) Field of Classification Search
None
See application file for complete search history.

(56) References Cited

U.S. PATENT DOCUMENTS

| 5,911,773 | A | * | 6/1999 | Mutsuga et al. | 701/200 |
| 2004/0023640 | A1 | * | 2/2004 | Ballai | 455/411 |
| 2004/0198220 | A1 | * | 10/2004 | Whelan et al. | 455/41.1 |
| 2006/0084381 | A1 | * | 4/2006 | Hartwig | 455/41.2 |
| 2007/0115868 | A1 | * | 5/2007 | Chen et al. | 370/315 |

OTHER PUBLICATIONS facility. (2007). In the American Heritage® Dictionary of the English Language. Retrieved from http://www.credoreference.com/entry/hmdictenglang/facility.*
decode. (2004). In Merriam-Webster's Collegiate Dictionary, 11th ed., p. 323.*

* cited by examiner

*Primary Examiner* — Calvin L Hewitt, II
*Assistant Examiner* — Mohammad A Nilforoush
(74) *Attorney, Agent, or Firm* — Ingrassia Fisher & Lorenz, P.C.

(57) ABSTRACT

A device, such as a vehicle, and a method within the device are provided for protecting the privacy of device specific information. The method includes the steps of detecting a beacon transmitted by an association requestor, determining whether the association requestor is an authorized requester by determining whether a present parameter falls within a range of authorized parameters associated with the association requestor, and transmitting the device specific information to the authorized requester only if the present parameter falls within the range of authorized requester parameters.

9 Claims, 4 Drawing Sheets

METHOD AND APPARATUS FOR PROTECTING THE PRIVACY OF RESPONDER INFORMATION

TECHNICAL FIELD

The present invention generally relates to radio frequency (RF) communications, and more particularly relates to a method and apparatus for protecting the privacy of information specific to a particular device responding to an authentication request.

BACKGROUND OF THE INVENTION

Many short range radio frequency (RF) wireless links are established after reception of an association request from an RF beacon. For secure RF communications, an association response initiates the authentication process. However, transmission of the authentication response typically requires transmission of sensitive device specific information, such as a devices Media Access Control (MAC) address and/or the device credential information, thereby revealing the private information of the device even before authenticating the RF beacon.

For example, many automobiles today include diagnostic and prognostic circuitry which monitors the state of health of the vehicle, storing state of health information for use by a facility when diagnosing and servicing a vehicle. It is preferable that authorized facilities, such as vehicle dealer service facilities, can access the state of health information wirelessly through a service drive application via a short range RF wireless link such as WiFi when a vehicle is brought in for servicing. In this manner, dedicated state of health data ports are not required while enabling a quick diagnosis of the vehicle and correlation of the vehicle's state of health with the vehicle's service history. In order for the authorized facility to access the vehicle's state of health information, the facility must first authenticate communication with the vehicle which requires the vehicle to transmit sensitive vehicle specific information such as the vehicle's Media Access Control (MAC) address and the vehicle's electronic certificates.

Accordingly, it is desirable to provide a method and apparatus for protecting the privacy of vehicle specific information while allowing secure transmission of vehicle specific information. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided in a device for protecting the privacy of device specific information therein. The method includes the steps of detecting a beacon transmitted by an association requestor, determining whether the association requestor is an authorized requestor by determining whether a present parameter falls within a range of authorized requestor parameters associated with the requestor, and transmitting a probe request including the device specific information to the authorized requestor only if the present parameter falls within the range of authorized requestor parameters.

A method is also provided in a vehicle for protecting the privacy of vehicle specific information during an association phase of a short range radio frequency (RF) link communication. The method includes the steps of detecting a beacon transmitted by an association requestor, determining whether the association requestor is an authorized facility by determining whether a present parameter falls within a range of authorized facility parameters, and transmitting the vehicle specific information to the authorized facility only if the present parameter falls within the range of authorized facility parameters.

Further, a vehicle is provided which protects the privacy of vehicle specific information during an association phase of a short range RF link communication. The vehicle includes transceiver circuitry including receiver circuitry and transmitter circuitry, a memory, and a controller. The memory stores predetermined authorized facility information. The controller is coupled to the receiver circuitry for receiving information transmitted by an association requester. The controller is also coupled to the memory and determines whether the requester is an authorized facility by determining whether a present parameter measured by the controller falls within a range of authorized facility parameters in response to the predetermined authorized facility information. The controller then provides vehicle specific information to the transmitter circuitry for forwarding to the authorized facility only if the controller has determined that the present parameter falls within the range of authorized facility parameters.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
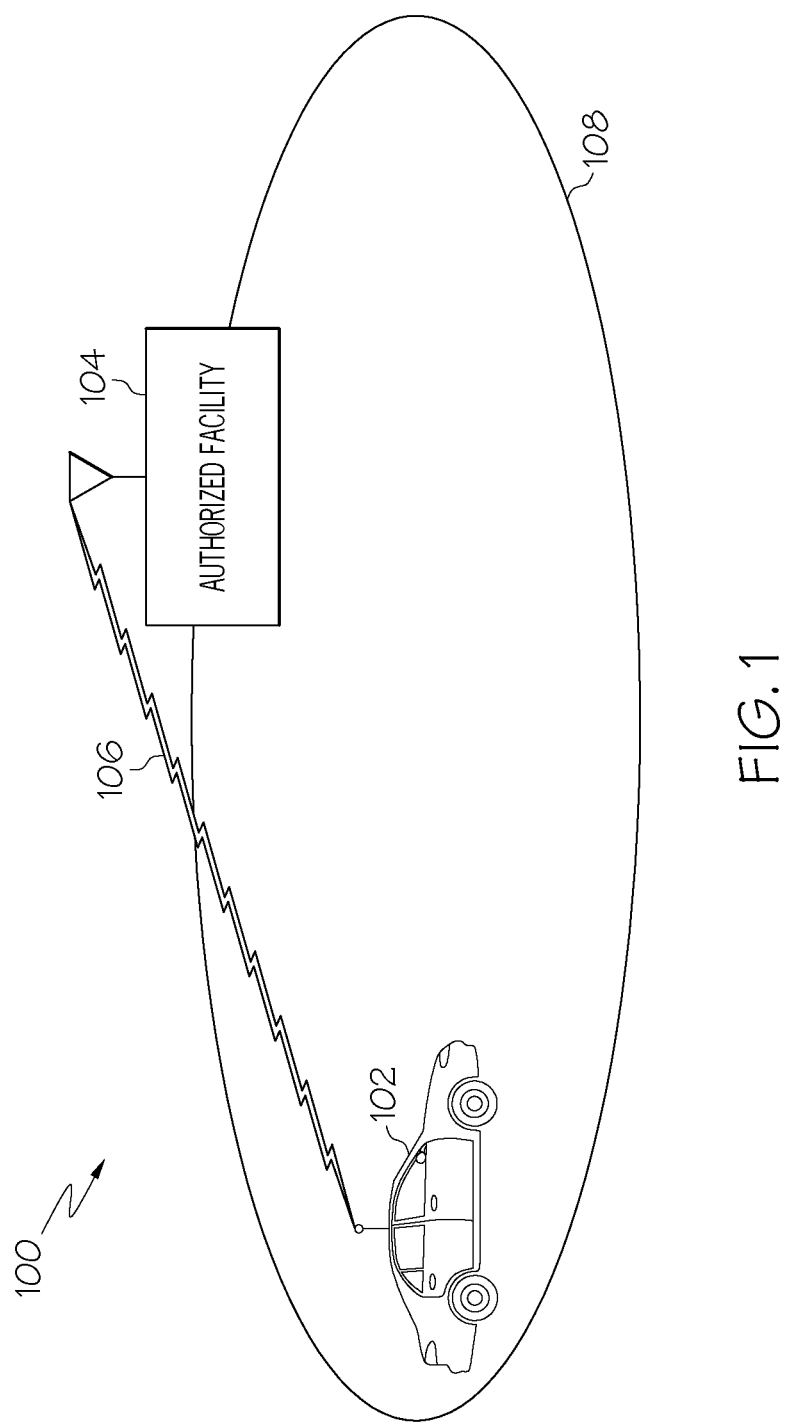
FIG. 1 illustrates a diagram of a system including a vehicle and an authorized facility in accordance with an embodiment of the present invention.

Referring to FIG. 1, a system 100 is depicted which implements a service drive application where a vehicle 102 uploads vehicle state of health information to an authorized facility 104, such as an authorized dealership. The vehicle 102 transmits the vehicle state of health information via short range radio frequency (RF) signals 106 (e.g., WiFi signals) to the authorized facility 104.

The service drive application is transparent and autonomous to the user of the vehicle 102. In accordance with one embodiment, the authorized facility 104 transmits a beacon as an advertised access point for short range RF wireless communication. The beacon includes known identification information such as a service set identifier (SSID) to advertise presence of the authorized facility 104 on a short range RF channel 106. When the vehicle 102 comes within the reception area 108, the vehicle 102 detects the beacon transmission on the short range RF channel and may initiate an association phase for short range RF wireless communication. However, the vehicle 102 does not want to associate with the beacon until certain preconditions are met in order to protect the privacy of vehicle specific information. If the vehicle 102 identifies the authorized facility 104 in response to the secure identification information in the beacon transmission, the vehicle will then authenticate the authorized facility 104. As discussed in more detail below, the vehicle 102 identifies the authorized facility 104 by determining whether a present parameter such as time or location falls within a range of authorized facility parameters corresponding to the authorized facility 104. Only after the authorized facility 104 has been confirmed does the vehicle 102 transmit a probe request which includes vehicle specific information such as the vehicle's Media Access Control (MAC) address, the vehicle's private certificates. An authentication phase follows the association phase and, after successful authentication of the authorized facility 104, the vehicle 102 transmits the vehicle's state of health information.

While the present embodiment discussed herein describes an embodiment of a service drive application for wireless enabled motor vehicles, those skilled in the art of RF communications will realize that the methodology of protecting device sensitive information has application in other short- and long-range RF wireless link association phases. For example, a GPS-enabled mobile wireless communication device, such as a cellular phone, when entering a WiFi access area (e.g., an authorized cellular service facility) could utilize the methodology of the present embodiment to protect the privacy of the wireless communication device's MAC address and/or electronic certificates during an association phase of a communication link.

Figure 2:
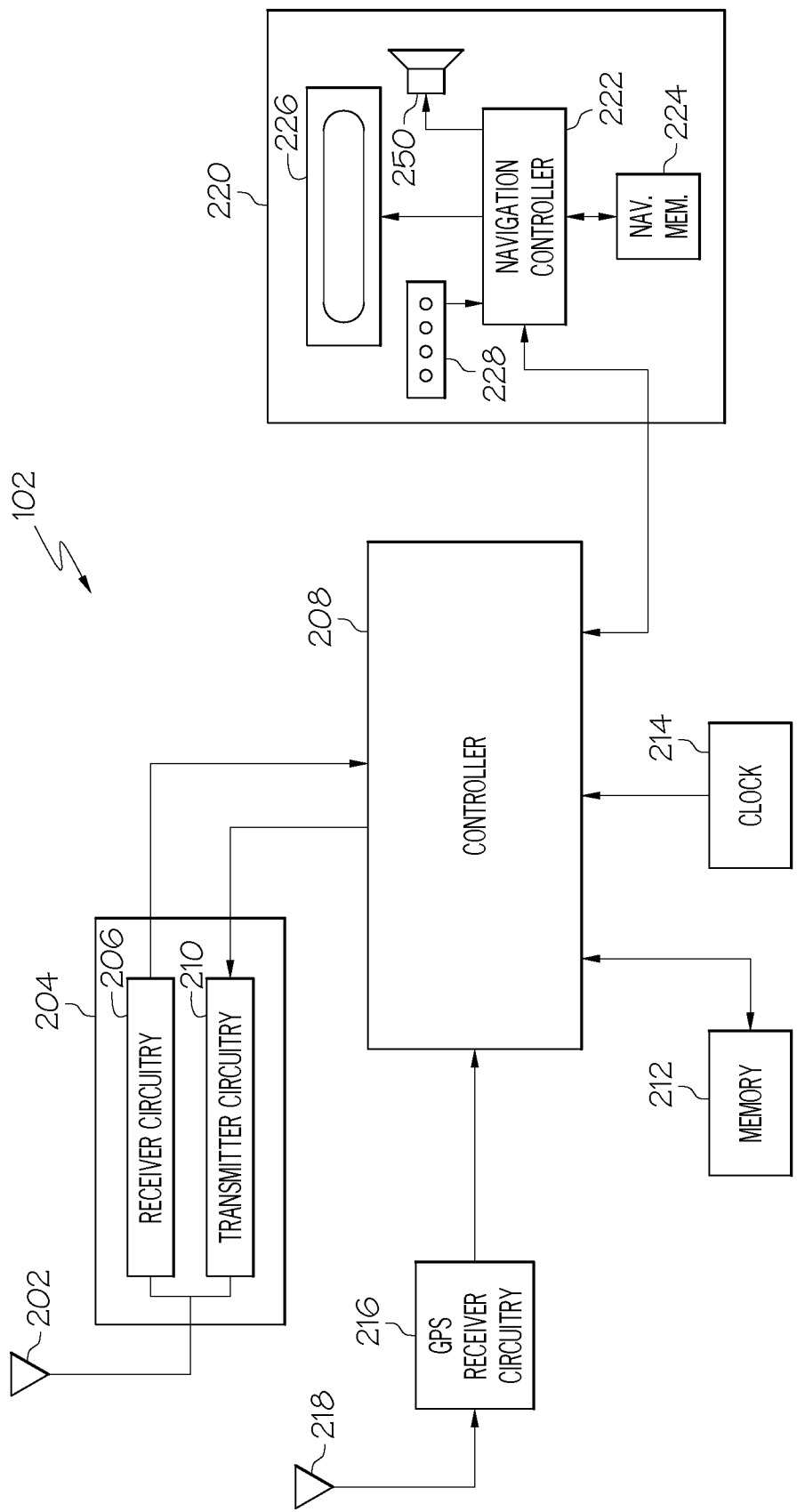
FIG. 2 illustrates a block diagram of an apparatus of the vehicle of the system of FIG. 1 in accordance with the embodiment of the present invention.

Referring to FIG. 2, a block diagram of circuitry in the vehicle 102 in accordance with the present embodiment includes an antenna 202 for receiving and transmitting RF signals on a short range RF channel 106, such as a WiFi channel, is coupled to transceiver circuitry 204. The transceiver circuitry 204 includes receiver circuitry 206 for demodulating and decoding the RF signals to recover information therefrom and is coupled to a controller 208 for providing the information thereto. The transceiver circuitry 204 also includes transmitter circuitry 210 for receiving information from the controller 208 and generating RF signals in response thereto by encoding information and modulating the encoded information onto RF waves within the short range RF channel 106.

The vehicle 102 also includes memory 212 coupled to the controller 208 and storing information for operation of the vehicle in accordance with the preferred embodiment, including predetermined authorized facility information. A clock 214 generates present time information indicating a present time and is coupled to the controller 208 for providing the present time information thereto. In addition, Global Positioning System (GPS) receiver circuitry 216 receives GPS signals via an antenna 218 tuned to a GPS signaling channel and generates a present location in response to the GPS signals received thereby, the GPS receiver circuitry coupled to the controller 208 for providing information indicating the present location thereto.

In addition to the above elements, the vehicle 102 may include a navigation device 220 for providing navigational assistance to a user of the vehicle. The navigation device 220 includes a navigation controller 222 and a navigation memory 224. The navigation memory 224 stores navigation map data and other information for the operation of the navigation device 220. Also, the navigation device 220 may include several user interface devices coupled to the controller such as a display 226 for providing visual navigation information, a user input device 228 comprising one or more buttons for receiving user inputs, and an audio output device 230, such as a speaker, for providing audible navigation information. The navigation device 220 operates in a manner familiar to those skilled in the art.

When RF signals (e.g., a beacon transmission) are received from the authorized facility 104 (FIG. 1), the antenna 202 provides the signals to the receiver circuitry 206 which demodulates and decodes the signals to recover information. The receiver circuitry 206 provides the recovered information to the controller 208. When the controller 208 determines that the information is a beacon transmitted by an association requestor, the controller 208 determines whether the association requestor is the authorized facility 104 by determining whether a present parameter, such as a present time or a present location or both, measured by the controller 208 falls within a range of authorized facility parameters. Only if the controller 208 determines that the present parameter falls within a range of authorized facility parameters does the controller 208 provide probe request information including vehicle specific information to the transmitter circuitry 210 for encoding and modulating to generate RF signals for transmission from the antenna 202 to the authorized facility 104.

Figure 3:
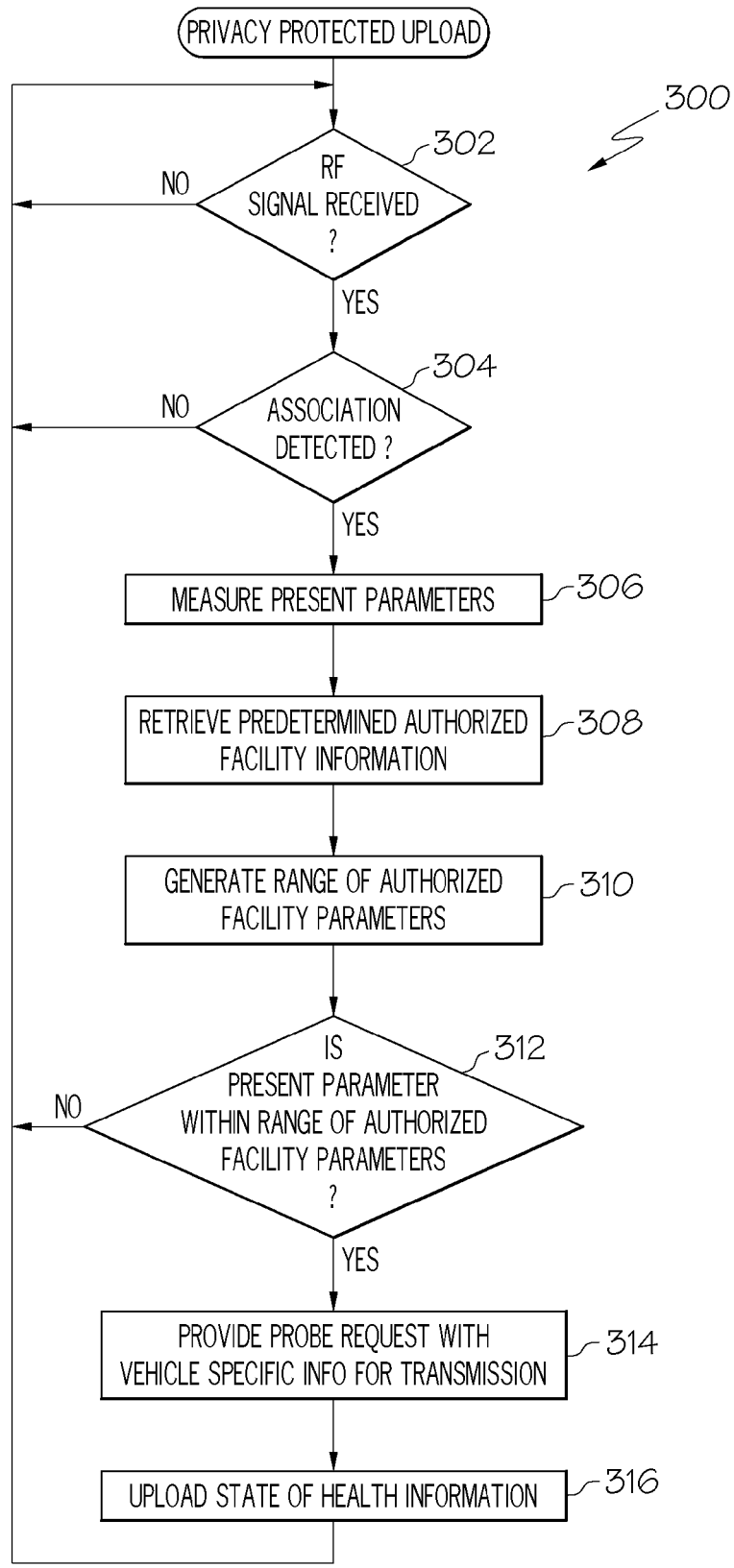
FIG. 3 illustrates a flow chart of a first operation of the apparatus of FIG. 2 in accordance with the embodiment of the present invention.

A first operation of the controller 208 of the vehicle 102 in accordance with the present embodiment is depicted in a flowchart 300 in FIG. 3. In accordance with this first operation, a secure and privacy protected upload of vehicle state of health information from the vehicle 102 to the authorized facility 104, the controller 208 determines from the output of the receiver circuitry 206 whether RF signals have been received 302. When RF signals are received 302, the controller 208 determines whether a beacon has been detected within the RF signals 304. A beacon typically includes SSID information identifying the authorized facility 104 transmitting the beacon.

When a beacon transmission is detected 304, the controller 208 checks the input from either or both of the clock 214 or the GPS receiver circuitry 216 to measure 306 a present parameter, i.e., a present time and/or a present location. The controller 208 then retrieves 308 predetermined authorized facility information from the memory 212 and generates therefrom 310 a range of authorized facility parameters.

For example, the controller 208 can generate 310 the range of authorized facility parameters by generating operating times during which the authorized facility 104 is open for business by identifying the authorized facility 104 in response to the SSID in the beacon transmission and retrieving 308 operating times for authorized facility, thereby generating the range of authorized facility parameters by generating 310 operating times during which the authorized facility 104 is open for business in response to the secure identification information. The controller 208 then determines 312 whether the present time is within the operating times for the authorized facility 104.

Alternatively, the controller 208 can generate 310 the range of authorized facility parameters by generating locations within an allowable radius of the authorized facility 104 by identifying the authorized facility 104 in response to the SSID information in the beacon transmission and retrieving 308 a location of the authorized facility 104 and a predetermined allowable error, thereby generating the range of authorized facility parameters by generating 310 locations within an allowable radius of the location of the authorized facility 104 in response to the secure identification information. The controller 208 then determines 312 whether the present location is within the allowable radius of the location of the authorized facility 104.

When the present parameter (present time, present location or both) is within the range of authorized facility parameters 312, the controller 208 provides 314 probe request information to the transmitter circuitry 210 for encoding and modulating for transmission as RF signals from the antenna 202 for transmission of a probe request to the authorized facility 104 to initiate an association phase for short range RF communication. The probe request typically includes the MAC address and one or more electronic certificates identifying the vehicle 102 to initiate handshaking between the vehicle 102 and the authorized facility 104. Thereafter, the controller 208 authenticates the authorized facility 104 during an authentication phase, and then provides the vehicle state of health information to the transmitter circuitry for uploading 316 to the authorized facility 104.

In this manner, the controller 208 authenticates the authorized facility 104 while protecting the privacy of any vehicle specific information, such as the MAC address or electronic certificates, thereby maintaining the privacy of the vehicle 102 WiFi communication. The privacy of the vehicle specific information is protected by not transmitting the vehicle specific information during the association phase of the short range RF communication until the controller 208 determines that certain preconditions of time and/or location have been met. An association phase can be initiated by either party to a short range RF communication and, accordingly, instead of the controller 208 generating a probe request 314 in response to detection of a beacon transmission 304, the controller 208 could detect an association request from the authorized facility 104 at step 304 and could, in response thereto, generate an association response at step 314.

To provide greater protection, the predetermined authorized facility information such as the operating hours of the authorized facility 104 or the location of the authorized facility 104 and an allowable radius could be programmed into the memory 212 upon manufacture of the vehicle or with dedicated programming equipment at an authorized facility 104. In one alternate embodiment, the location of authorized facilities could be downloaded into the navigation memory 224 as part of the navigation map data stored therein, the controller 208 retrieving the location information from the navigation memory 224 instead of the memory 212. This information could be downloaded to the navigation memory 224 upon manufacture or in an update from a navigation service provider (e.g., OnStar®).

Figure 4:
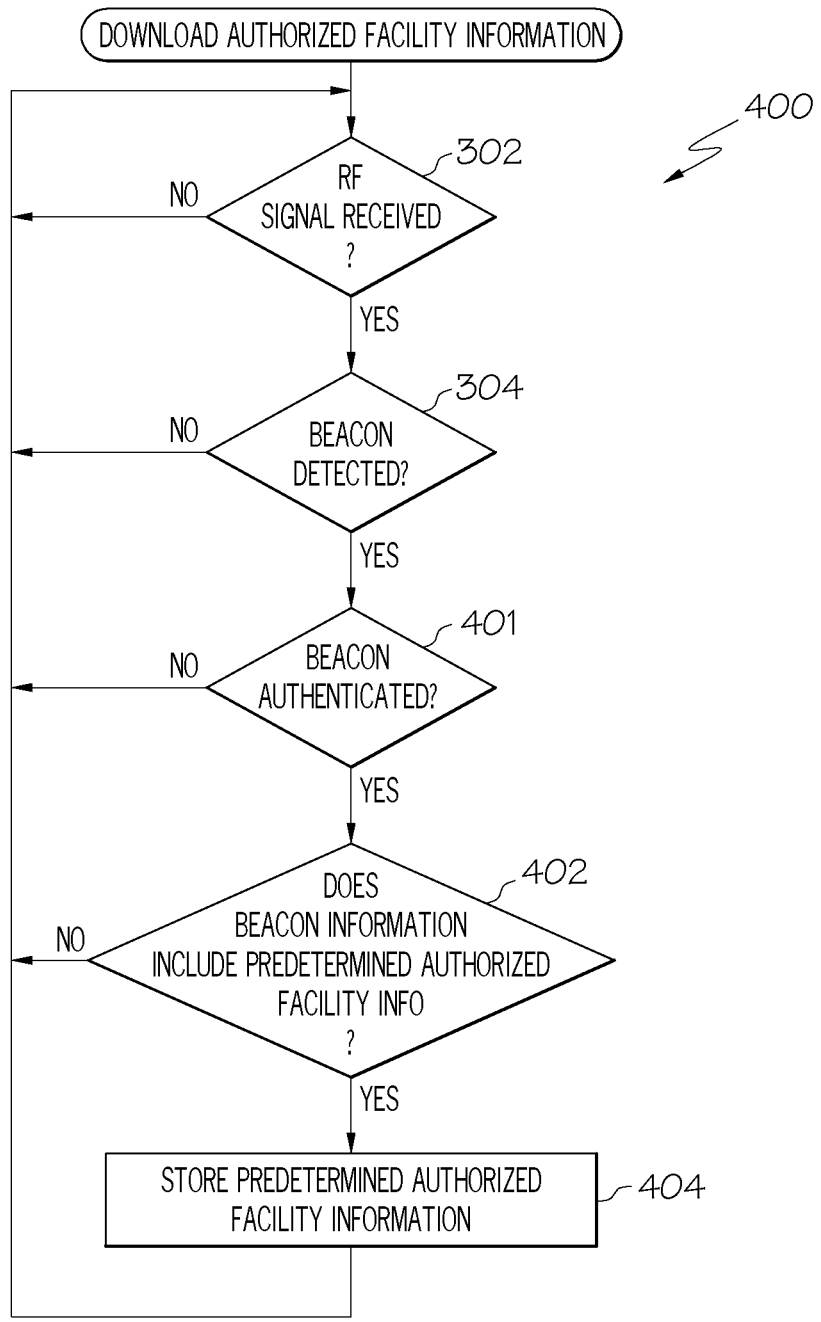
FIG. 4 illustrates a flow chart of a second operation of the apparatus of FIG. 2 in accordance with the embodiment of the present invention.

In yet another embodiment, the predetermined authorized facility information could be transmitted to the vehicle in a securely signed message from an authorized facility 104 in a communication intended for the vehicle or transmitted as part of the beacon transmission transmitted by the authorized facility. A flowchart 400 in FIG. 4 depicts this second operation of the controller 208 in accordance with the present embodiment where the predetermined authorized facility information is downloaded wirelessly to the vehicle 102.

After determining that RF signals are received 302 and the beacon is detected 304, the controller 208 authenticates 401 the beacon transmission. If the beacon transmission is authenticated 401, the controller 208 determines 402 whether the beacon information includes predetermined authorized facility information. If the beacon information does include predetermined authorized facility information 402, the controller stores 404 the predetermined authorized facility information in the memory 212 for later use in accordance with the present embodiment.

As described above, the association phase is a form of handshake between the vehicle 102 and the authorized facility 104 before exchanging information therewith. While step 401 specifying authentication of the beacon transmission in this second operation 400, a handshaking routine could be utilized to determine preconditions identifying the authorized facility 104 before identifying 402 and storing 404 predetermined authorized facility information. For example, as mentioned above, an association request could be transmitted from the authorized facility 104 which includes the predetermined authorized facility information in a securely signed message.

Thus it can be seen that a method and a vehicle have been provided for securely transmitting vehicle specific information which preserves the vehicle's privacy. While enabling the secure download of vehicle state of the health information, the present embodiment protects the privacy of the vehicle while permitting secure communication.

While at least one exemplary embodiment has been presented in the foregoing detailed description, it should be appreciated that a vast number of variations exist. For example, instead of a vehicle downloading state of health information to an authorized facility, an embodiment could be enabled in a mobile phone and protect the privacy of the phone's MAC address and electronic certificates while permitting secure WiFi connections at a public facility or at a mobile phone authorized facility. Further, an embodiment could be utilized in a wireless and GPS-enabled laptop computer and protect the privacy of the computer's MAC address and electronic certificates while permitting secure WiFi connections within a public or private WiFi access area. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicle comprising:
   transceiver circuitry including receiver circuitry and transmitter circuitry;
   a memory storing predetermined authorized facility information and instructions;
   a controller coupled to the receiver circuitry and to the memory, the instructions, when executed by the controller, cause the controller to perform the steps of:
   receiving information via the receiver circuitry transmitted by an association requestor, wherein the information received by the receiver circuitry includes service set identifier information corresponding to one or more authorized facilities,
   generating a range of authorized facility parameters by generating operating times during which the authorized facility is open for business in response to the service set identifier information,
   determining whether the association requestor is an authorized facility by determining whether a present parameter that is measured by the controller falls within the range of authorized facility parameters in response to the predetermined authorized facility information, wherein determining whether the present parameter falls within a range of authorized facility parameters comprises determining whether a present time is within the operating times during which the authorized facility is open for business, and providing vehicle specific information to the transmitter circuitry for forwarding to the authorized facility only when the controller has determined that the present parameter falls within the range of authorized facility parameters.

2. The vehicle in accordance with claim 1 further comprising a clock coupled to the controller, the clock is configured to:

generate present time information indicating a present time, and generate the present parameter in response to the present time.

3. The vehicle in accordance with claim 1 further comprising a Global Positioning System (GPS) receiver circuitry coupled to the controller, the GPS receiver configured to generate a present location in response to signals received thereby.

4. The vehicle in accordance with claim 1 further comprising:

a navigation device coupled to the controller, the navigation device is configured to provide navigational assistance to a user of the vehicle, the navigation device including a navigation memory for storing navigation map data, wherein the controller is configured to retrieve the authorized facility information from the navigation device.

5. The vehicle in accordance with claim 1, wherein the receiver circuitry receives a message including the predetermined authorized facility information, and wherein the controller stores the predetermined authorized facility information from the message to the memory in response to determining that the message is a securely signed message.

6. The vehicle in accordance with claim 1, wherein the receiver circuitry receives the predetermined authorized facility information in a beacon transmission, and wherein the controller decodes the predetermined authorized facility information from the beacon transmission and stores the predetermined authorized facility information to the memory in response to determining that the beacon transmission is a beacon transmission transmitted by the authorized facility.

7. The vehicle in accordance with claim 1, wherein the predetermined authorized facility information includes:

daily opening and closing information for the authorized facility, and a location of the authorized facility and an allowable radius.

8. The Vehicle in accordance with claim 1, wherein the controller is configured to:

generate the range of authorized facility parameters by generating locations within the allowable radius of the location of the authorized facility in response to the service set identifier information and then determining whether the present location is within the locations within the allowable radius of the location of the authorized facility.

9. The vehicle in accordance to claim 3, wherein the controller is coupled to the GPS receiver circuitry, the controller is configured to generate the present parameter in response to the present location.

\* \* \* \* \*